US010807550B2

United States Patent
Purushothaman et al.

(10) Patent No.: US 10,807,550 B2
(45) Date of Patent: Oct. 20, 2020

(54) VEHICLE HAVING COLLISION DETECTION DEVICE

(71) Applicants: Dipu Purushothaman, Auburn Hills, MI (US); Kalu Uduma, Detroit, MI (US); Hamid Keshtkar, Rochester Hills, MI (US)

(72) Inventors: Dipu Purushothaman, Auburn Hills, MI (US); Kalu Uduma, Detroit, MI (US); Hamid Keshtkar, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/224,995

(22) Filed: Dec. 19, 2018

(65) Prior Publication Data

US 2020/0198566 A1 Jun. 25, 2020

(51) Int. Cl.
*B60R 21/0136* (2006.01)
*B60R 21/21* (2011.01)
*B60R 21/00* (2006.01)
*B60R 21/01* (2006.01)

(52) U.S. Cl.
CPC .......... *B60R 21/0136* (2013.01); *B60R 21/21* (2013.01); *B60R 2021/0006* (2013.01); *B60R 2021/01006* (2013.01)

(58) Field of Classification Search
CPC ... B60R 21/0136; B60R 21/21; B60R 21/213; B60R 21/206; B60R 2021/0004; B60R 2021/0006; B60R 2021/01006; B60R 2021/23107
See application file for complete search history.

(56) References Cited

U.S. PATENT DOCUMENTS

| | | | |
|---|---|---|---|
| 5,748,075 A | 5/1998 | Dirmeyer et al. | |
| 8,006,797 B2 | 8/2011 | Aoyama | |
| 2006/0232052 A1* | 10/2006 | Breed | B60R 21/013 280/735 |
| 2006/0237255 A1* | 10/2006 | Wanami | B60R 21/0136 180/274 |
| 2008/0243342 A1* | 10/2008 | Breed | B60R 21/0132 701/45 |
| 2008/0272580 A1* | 11/2008 | Breed | B60R 21/0132 280/735 |
| 2008/0284145 A1* | 11/2008 | Breed | B60R 21/0132 280/736 |
| 2009/0152848 A1* | 6/2009 | Sadr | B60R 21/13 280/730.2 |
| 2011/0133435 A1* | 6/2011 | Sadr | B60R 21/13 280/730.1 |
| 2011/0251760 A1 | 10/2011 | Aoki et al. | |
| 2012/0188662 A1* | 7/2012 | Hamada | B60R 1/06 359/871 |
| 2012/0261941 A1* | 10/2012 | Sadr | B60R 21/13 296/146.1 |

(Continued)

*Primary Examiner* — Orlando Bousono
(74) *Attorney, Agent, or Firm* — Ralph E Smith

(57) ABSTRACT

A vehicle includes a vehicle door and a diaphragm. The vehicle door includes an inner door panel and an outer door panel that define a door cavity therebetween. The diaphragm is disposed within the door cavity and is attached to an inner surface of the outer door panel. The diaphragm cooperates with the inner surface of the outer door panel to define a diaphragm cavity.

11 Claims, 3 Drawing Sheets

(56) References Cited

U.S. PATENT DOCUMENTS

| | | | |
|---|---|---|---|
| 2013/0341893 A1* | 12/2013 | Sadr | B60R 21/13 280/730.1 |
| 2014/0103624 A1* | 4/2014 | Breed | B60R 21/0132 280/728.3 |
| 2014/0346759 A1* | 11/2014 | Sadr | B60R 21/13 280/751 |
| 2015/0298642 A1* | 10/2015 | Sadr | B60R 21/13 280/730.2 |
| 2018/0037186 A1* | 2/2018 | Sadr | B60R 21/13 |
| 2019/0161045 A1* | 5/2019 | Thomas | B60R 21/2338 |

* cited by examiner

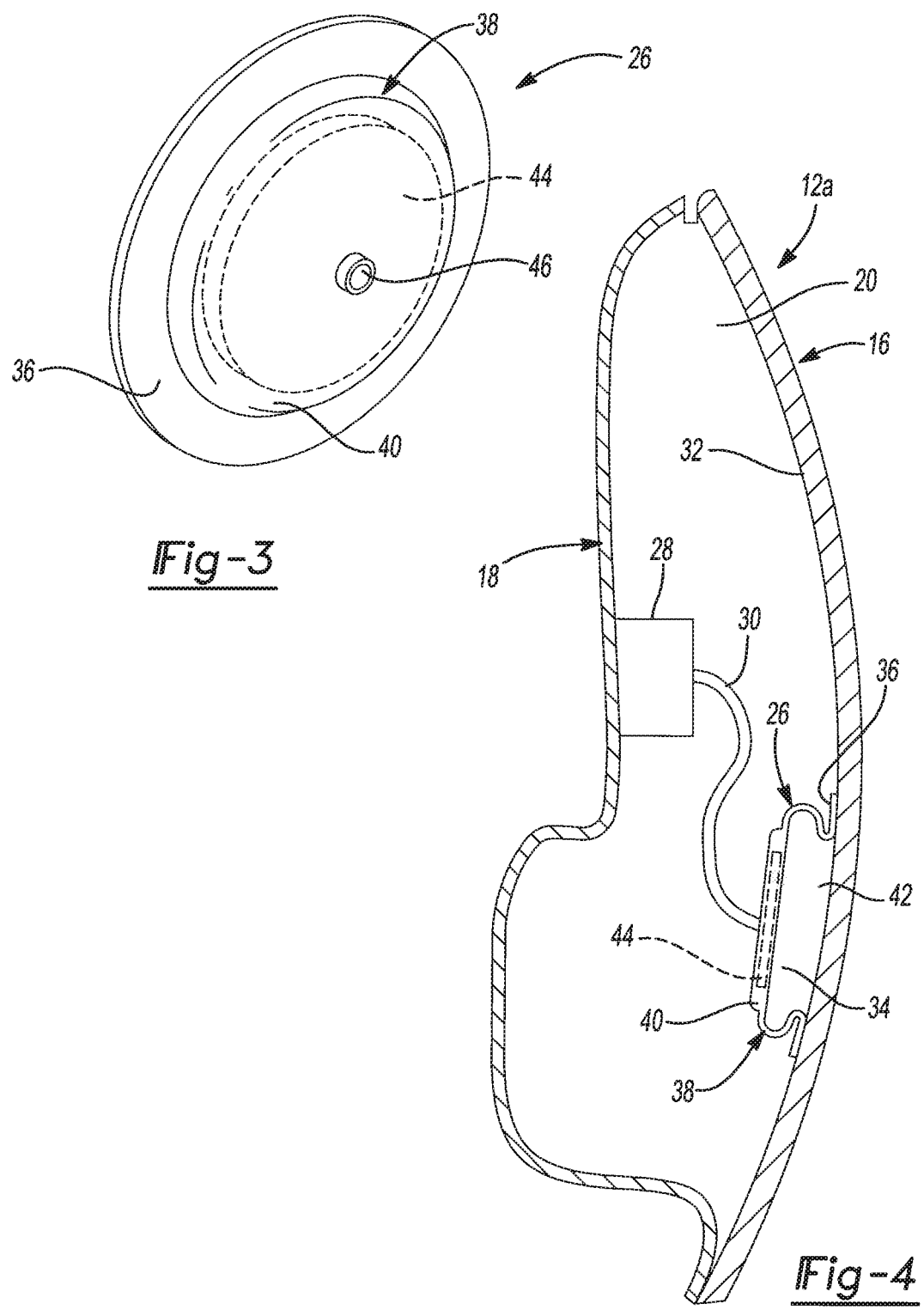

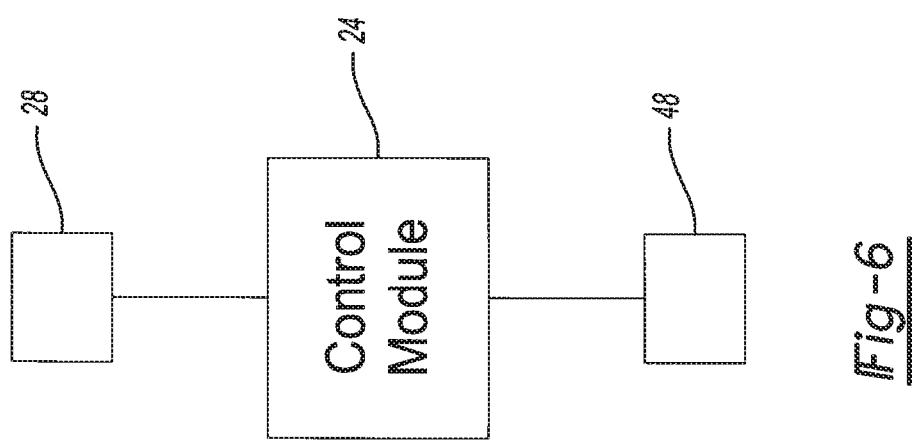
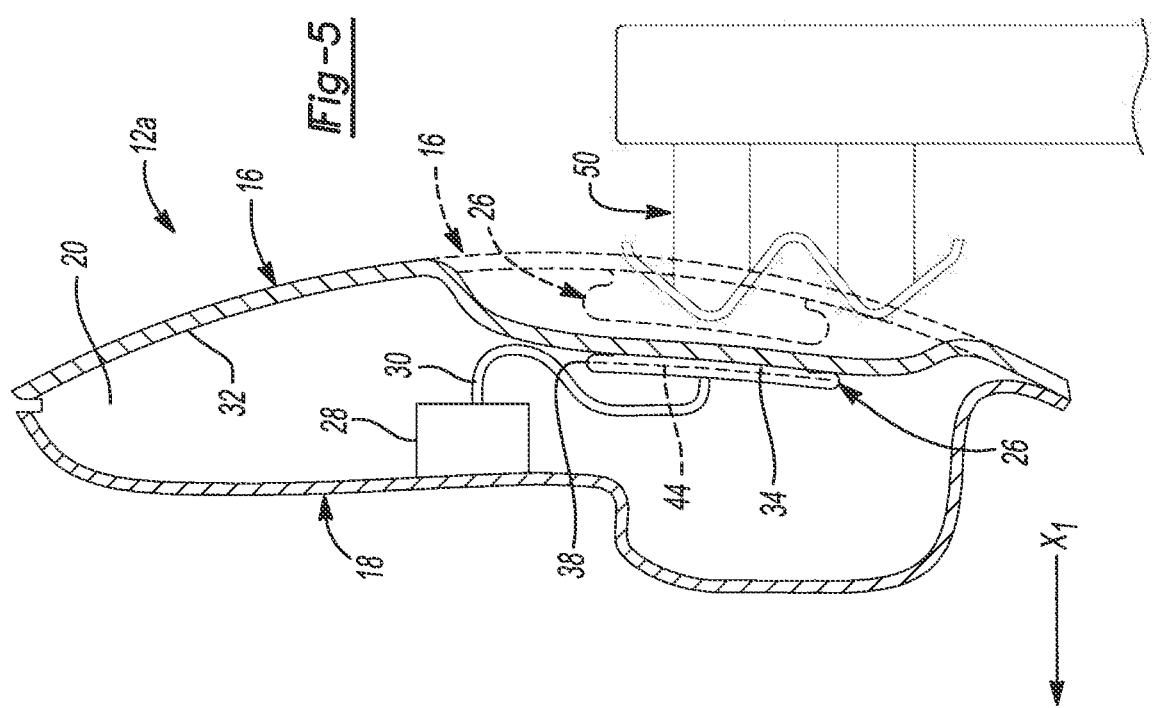

VEHICLE HAVING COLLISION DETECTION DEVICE

FIELD

The present disclosure relates to a vehicle collision detection device.

BACKGROUND

This section provides background information related to the present disclosure and is not necessarily prior art.

Some vehicles include a collision detection apparatus disposed within a cavity of a vehicle door. The collision detection apparatus communicates with a control module of the vehicle so as to deploy a vehicle airbag associated with the vehicle door upon an impact event. Such collision detection apparatuses perform inadequately due to air leakage within the door cavity and are difficult to adapt with vehicles having different door designs. The collision detection device of the present disclosure performs adequately despite any air leakage of the door cavity and is easily adaptable to vehicles having different door designs.

SUMMARY

This section provides a general summary of the disclosure, and is not a comprehensive disclosure of its full scope or all of its features.

In one form, the present disclosure provides a vehicle including a vehicle door and a diaphragm. The vehicle door includes an inner door panel and an outer door panel that define a door cavity therebetween. The diaphragm is disposed within the door cavity and is attached to an inner surface of the outer door panel. The diaphragm is cooperating with the inner surface of the outer door panel to define a diaphragm cavity.

In some configurations of the vehicle of the above paragraph, the diaphragm includes a main body and a rim, and wherein the rim extends at least partially around a periphery of the main body.

In some configurations of the vehicle of any one or more of the above paragraphs, the rim is attached to the inner surface of the outer door panel such that the diaphragm cavity is sealed.

In some configurations of the vehicle of any one or more of the above paragraphs, the main body includes a cover member opposite an opening of the main body.

In some configurations of the vehicle of any one or more of the above paragraphs, a plate is embedded in the cover member of the main body.

In some configurations of the vehicle of any one or more of the above paragraphs, the plate and the main body remain in an initial state of rest relative to the vehicle during an impact event.

In some configurations of the vehicle of any one or more of the above paragraphs, the outer door panel is configured to be displaced toward the plate and the main body during an impact event.

In some configurations of the vehicle of any one or more of the above paragraphs, the plate and the main body remain in an initial state of rest relative to the vehicle during an impact event and the outer door panel is configured to be displaced toward the plate and the main body during the impact event.

In some configurations of the vehicle of any one or more of the above paragraphs, the diaphragm cavity decreases in volume and increases in pressure when the plate and the main body remain in the initial state of rest relative to the vehicle.

In some configurations of the vehicle of any one or more of the above paragraphs, the diaphragm cavity decreases in volume and increases in pressure when the outer door panel is displaced toward the plate and main body.

In some configurations of the vehicle of any one or more of the above paragraphs, the diaphragm cavity decreases in volume and increases in pressure when the plate and the main body remain in the initial state of rest relative to the vehicle and the outer door panel is displaced toward the plate and the main body.

In some configurations of the vehicle of any one or more of the above paragraphs, a pressure sensor disposed within the door cavity and operatively connected to the diaphragm and a control module.

In some configurations of the vehicle of any one or more of the above paragraphs, the control module is configured to deploy a vehicle airbag when the pressure differential within the diaphragm cavity exceeds a predetermined value.

In some configurations of the vehicle of any one or more of the above paragraphs, the diaphragm is made of a neoprene material.

In some configurations of the vehicle of any one or more of the above paragraphs, the plate is made of a metallic or non-metallic material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a perspective view of a collision-detection device of the collision-detection system of FIG. 1;

FIG. 4 is a cross-sectional view of a vehicle door of the vehicle of FIG. 1;

FIG. 5 is a cross-sectional view of the vehicle door of the vehicle of FIG. 1 experiencing a load; and FIG. 6 is a block diagram illustrating communication between a control module and components of the vehicle of FIG. 1.

Corresponding reference numerals indicate corresponding parts throughout the several views of the drawings.

DETAILED DESCRIPTION

Figure 1:
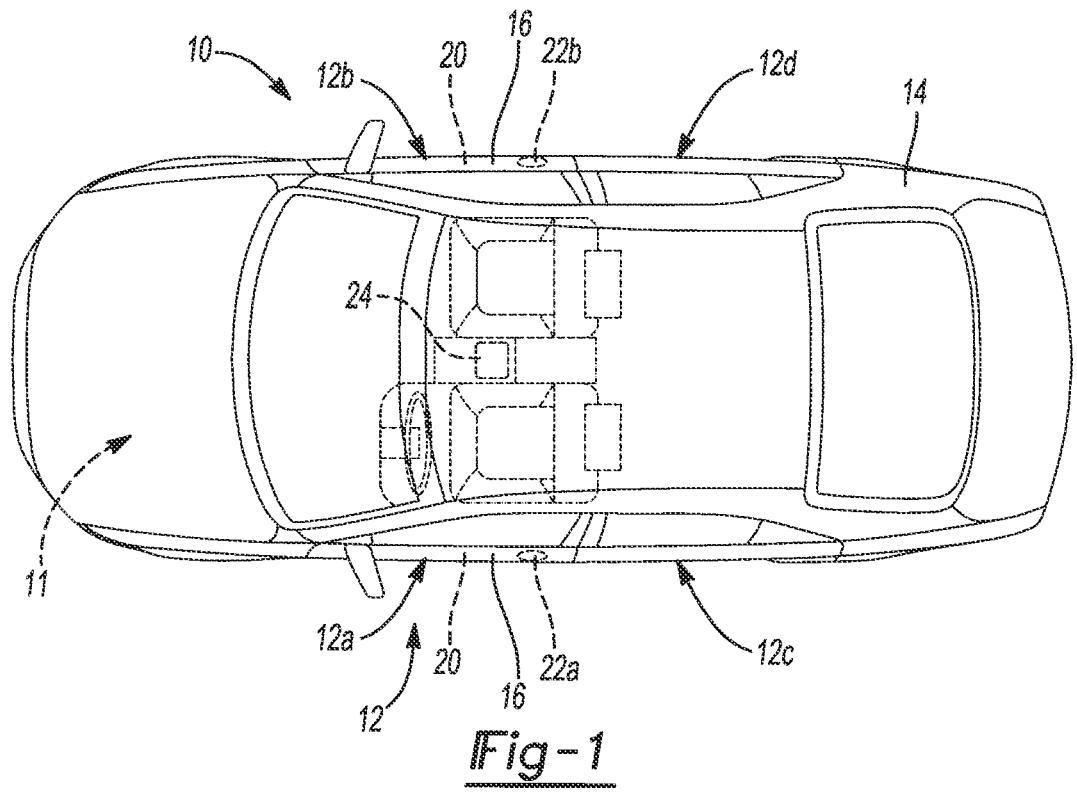
FIG. 1 is a top view of a vehicle having a collision-detection system according to the principles of the present disclosure.
Figure 2:
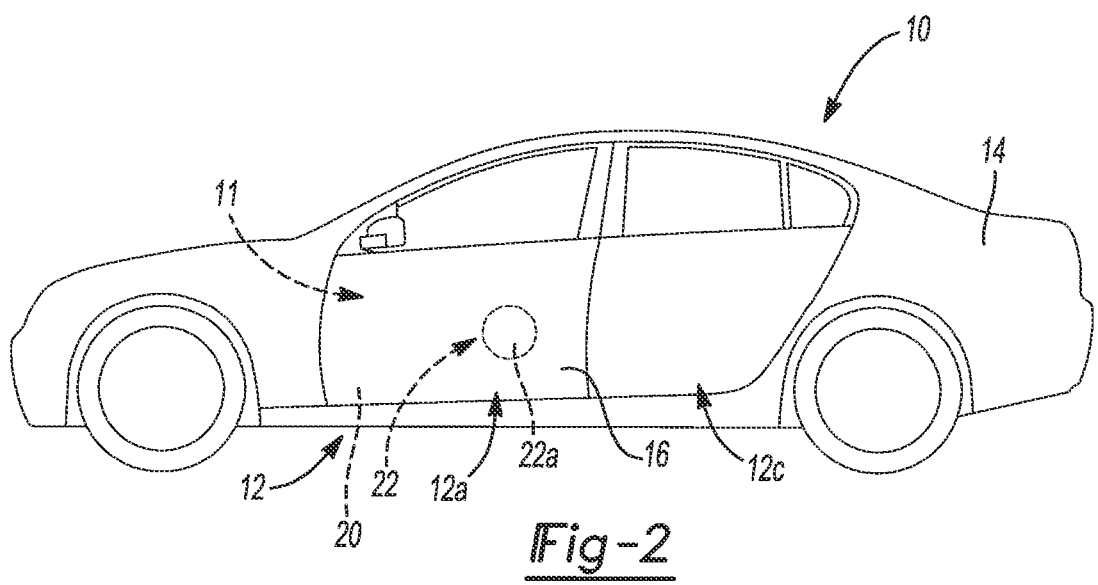
FIG. 2 is a side view of the vehicle of FIG. 1.

Example embodiments will now be described more fully with reference to the accompanying drawings.

With reference to FIGS. 1-6, a vehicle 10 (FIGS. 1 and 2) having a collision-detection system 11 is provided. The vehicle 10 includes a plurality of doors 12 (comprising a front driver side door 12a, a front passenger side door 12b, a rear driver side door 12c and a rear passenger side door 12d) that are rotatably attached to a vehicle body 14 between closed positions (FIGS. 1 and 2) and open positions (not shown). Each door 12 includes an outer door panel 16

(FIGS. 1, 2, 4 and 5) and an inner door panel 18 (FIGS. 4 and 5) that define a door cavity 20 therebetween. The collision-detection system 11 includes a plurality of collision-detection devices 22 (comprising collision-detection devices 22a, 22b) and a control module 24.

As shown in FIG. 1, the collision-detection device 22a is disposed in the door cavity 20 of the front driver side door 12a and the collision-detection device 22b is disposed in the door cavity 20 of the front passenger side door 12b. It is also understood that the collision-detection devices 22 can also be disposed in the door cavities 20 of the rear driver side door 12c and the rear passenger side door 12d in addition to being disposed in the door cavities 20 of the front driver side door 12a and the front passenger side door 12b. Each collision-detection device 22 includes a diaphragm 26, a pressure sensor 28 and a tube 30.

With reference to FIGS. 3-5, the diaphragm 26 is attached to an inside surface 32 of the outer door panel 16 (within the door cavity 20) via an adhesive such that the inside surface 32 and the diaphragm 26 cooperate to define an enclosed diaphragm cavity 34 that has an airtight seal. Although the diaphragm 26 is shown attached toward a lower portion and a back end of the outer door panel 16, it should be understood that the diaphragm 26 can be attached to the outer door panel 16 at any location thereof (e.g., toward a middle portion and a front end of the outer door panel 16, toward an upper portion and a front end of the outer door panel 16, or toward an upper portion and a back end of the outer door panel 16). The diaphragm 26 is made out of a flexible material (e.g., neoprene) and includes a rim 36 and a main body 38.

The rim 36 extends around a periphery of the main body 38 and is attached to the inside surface 32 of the outer door panel 16 via the adhesive, thereby creating the airtight seal of the diaphragm cavity 34. The main body 38 includes a cover member 40 that is opposite an opening 42 thereof. A circular-shaped plate 44 is embedded within the cover member 40 of the main body 38 and is made of a metallic material. In some configurations, the plate 44 can be of a different shape (e.g., square) and made of a different material (e.g., a polymeric or non-metallic material). When the outer door panel 16 experiences a load (e.g., a side-impact event), the outer door panel 16 displaces into the door cavity 20 (i.e., in direction X1) and the plate 44 due to its inertia remains in an initial state of rest relative to the vehicle 10 (i.e., the plate 44 initially remains in a state of rest due to its inertia and then is displaced from its state of rest after a period of time). In this way, the diaphragm cavity 34 decreases in volume, thereby causing an increase in pressure.

The pressure sensor 28 is disposed within the door cavity 20 and is attached to the inner door panel 18. In some configurations, the pressure sensor 28 can be attached to the door module (not shown) or a structural member (not shown) disposed within the door cavity 20. The pressure sensor 28 is operatively connected to the diaphragm 26 via the tube 30 such that the pressure sensor 28 reads the pressure within the diaphragm cavity 34. As shown in FIGS. 4 and 5, the tube 30 is operatively connected to the pressure sensor 28 at one end and to a protrusion 46 (FIG. 3) extending from the cover member 40 at another end. The protrusion 46 is in fluid communication with the diaphragm cavity 34, thereby permitting the pressure sensor 28 to measure the pressure within the diaphragm cavity 34 via the tube 30. In some configurations, the protrusion 46 can extend from the rim 36, and the tube 30 can be operatively connected to the pressure sensor 28 at one end and to the protrusion 46 extending from the rim 36 at another end.

As shown in FIG. 6, the control module 24 is in communication with the pressure sensors 28 of the collision-detection devices 22 and vehicle airbags 48 mounted to respective seat frame assemblies (not shown) disposed in the vehicle 10. The control module 24 is configured to deploy the vehicle airbags 48 mounted to the respective seat frame assemblies (not shown) based at least partially on a pressure differential within the diaphragm cavity 34 of the doors 12. That is, the pressure sensors 28 communicate data to the control module 24. Based on the data received from the pressure sensors 28, the control module 24 can deploy the vehicle airbags 48 if the pressure differential within the diaphragm cavity 34 exceeds a predetermined value. For example, the control module 24 can deploy the vehicle airbag 48 mounted to the front drive side seat frame assembly (not shown) and/or the vehicle airbag 48 mounted to the rear drive side seat frame assembly (not shown) based on data received from the sensor 28 disposed in the door 12a. Similarly, the control module 24 can deploy the vehicle airbag 48 mounted to the front passenger side seat frame assembly (not shown) and/or the vehicle airbag 48 mounted to the rear passenger side seat frame assembly (not shown) based on data received from the sensor 28 disposed in the door 12b.

With continued reference to FIGS. 1-6, operation of the collision-detection system 11 will be described in detail. During normal operation of the vehicle 10, the diaphragm 26 is attached to the inside surface 32 of the outer door panel 16 and is in a relative state of state (FIG. 4). If the vehicle 10 experiences an impact event (e.g., a lateral impact event such as the front driver side door 12a colliding with a side rail 50), the outer door panel 16 is displaced inwardly in direction X1 (FIG. 5), whereas the plate 44 and the main body 38 of the diaphragm 26 remains in an initial state of rest with respect to the vehicle 10 due to the inertia of the plate 44 (i.e., the plate 44 initially remains in a state of rest due to its inertia and then is displaced from its state of rest after a period of time) . In this way, the diaphragm cavity 34 decreases in volume, which causes an increase in pressure. If the pressure differential within the diaphragm cavity 34 exceeds a predetermined value, the control module 24 deploys the airbag 48 (associated with the front driver side door 12a).

One of the benefits of the present disclosure is that the diaphragm cavities 34 of the collision-detection devices 22 have an airtight seal. This improves the accuracy of the pressure differential measured therein, which reduces the time lag in deployment of the airbag and reduces variability in deployment time for a given vehicle body structure. Another benefit of the present disclosure is that the plate 44 embedded within the cover member 40 of the main body 38 induces a pressure differential within the diaphragm cavities 34 of the collision-detection devices 22 during an impact event without the need of support from the inner door panel 18 (or any other structural component of the vehicle door). This induced pressure differential is directly proportional to the rate of the outer door panel 16 intrusion, which makes it very easy to differentiate between a high and a low speed impact event. It should be understood that in some configurations, the cover member 40 can be made thicker such that the cover member 40 can induce a pressure differential within the diaphragm cavities 34 without the need for the plate 44 embedded therein.

The control module 24 of vehicle 10 is or includes any of a digital processor (DSP), microprocessor, microcontroller, or other programmable device which are programmed with software implementing the above described methods. It should be understood that alternatively they include other logic devices, such as a Field Programmable Gate Array (FPGA), a complex programmable logic device (CPLD), or application specific integrated circuit (ASIC). When it is stated that the control module 24 or any of the routines implemented therein perform a function or is configured to perform a function, it should be understood that the control module 24 is configured to do so with appropriate logic (such as in software, logic devices, or a combination thereof).

What is claimed is:

1. A vehicle comprising:
a vehicle door including an inner door panel and an outer door panel that define a door cavity therebetween, the inner door panel facing an interior of the vehicle and the outer door panel facing an exterior of the vehicle; and
a diaphragm disposed within the door cavity and attached to an inner surface of the outer door panel, the diaphragm cooperating with the inner surface of the outer door panel to define a diaphragm cavity,
wherein the diaphragm includes a main body and a rim, and wherein the rim extends at least partially around a periphery of the main body,
wherein the rim is attached to the inner surface of the outer door panel such that the diaphragm cavity is sealed,
wherein the main body includes a cover member opposite an opening of the main body,
wherein the main body remains in an initial state of rest relative to the vehicle during an impact event, and
wherein the diaphragm cavity decreases in volume and increases in pressure when the main body remain in the initial state of rest relative to the vehicle.

2. The vehicle of claim 1, wherein a plate is embedded in the cover member of the main body.

3. The vehicle of claim 2, wherein the outer door panel is configured to be displaced toward the plate and the main body during an impact event.

4. The vehicle of claim 2, wherein the plate and the main body remain in an initial state of rest relative to the vehicle during an impact event and the outer door panel is configured to be displaced toward the plate and the main body during the impact event.

5. The vehicle of claim 3, wherein the diaphragm cavity decreases in volume and increases in pressure when the outer door panel is displaced toward the plate and main body.

6. The vehicle of claim 4, wherein the diaphragm cavity decreases in volume and increases in pressure when the plate and the main body remain in the initial state of rest relative to the vehicle and the outer door panel is displaced toward the plate and the main body.

7. The vehicle of claim 4, further comprising a pressure sensor disposed within the door cavity and operatively connected to the diaphragm and a control module.

8. The vehicle of claim 7, wherein the control module is configured to deploy a vehicle airbag when the pressure differential within the diaphragm cavity exceeds a predetermined value.

9. The vehicle of claim 2, wherein the diaphragm is made of a neoprene material.

10. The vehicle of claim 9, wherein the plate is made of a metallic or non-metallic material.

11. The vehicle of claim 5, wherein the increase in pressure within the diaphragm cavity is directly proportional to a rate of the outer door panel displacement.

* * * * *